(12) United States Patent
Schuffenhauer et al.

(10) Patent No.: US 8,845,242 B2
(45) Date of Patent: Sep. 30, 2014

(54) COOLANT DISTRIBUTOR

(75) Inventors: Michael Schuffenhauer, Furth (DE); Ramona Beck, Forchheim (DE)

(73) Assignee: Kennametal Inc., Latrobe, PA (US)

( * ) Notice: Subject to any disclaimer, the term of this patent is extended or adjusted under 35 U.S.C. 154(b) by 390 days.

(21) Appl. No.: 13/091,806

(22) Filed: Apr. 21, 2011

(65) Prior Publication Data

US 2011/0262234 A1 Oct. 27, 2011

(30) Foreign Application Priority Data

Apr. 23, 2010 (DE) .......................... 10 2010 018 254

(51) Int. Cl.
*B23C 5/28* (2006.01)
*B23B 51/06* (2006.01)

(52) U.S. Cl.
USPC .............. 408/56; 408/59; 407/11; 409/136

(58) Field of Classification Search
USPC ............... 408/56, 57, 59, 61, 60; 279/20; 409/135, 136; 407/11, 35
See application file for complete search history.

(56) References Cited

U.S. PATENT DOCUMENTS

| | | | | |
|---|---|---|---|---|
| 2,867,140 A * | 1/1959 | Getts | ................................ | 408/57 |
| 4,032,250 A * | 6/1977 | Lavallee | .......................... | 408/59 |
| 4,127,279 A * | 11/1978 | Wright | ............................ | 279/156 |
| 4,705,435 A * | 11/1987 | Christoffel | ......................... | 408/59 |
| 4,921,376 A * | 5/1990 | Tani et al. | ...................... | 409/131 |
| 6,450,738 B1 * | 9/2002 | Ripley | .............................. | 407/35 |
| 6,595,727 B2 * | 7/2003 | Arvidsson | ........................ | 407/35 |
| 7,125,207 B2 * | 10/2006 | Craig et al. | ..................... | 409/136 |
| 7,431,543 B2 * | 10/2008 | Buettiker et al. | .............. | 408/233 |
| 7,537,422 B2 * | 5/2009 | Ballas et al. | ................... | 409/136 |
| 7,775,751 B2 * | 8/2010 | Hecht et al. | ....................... | 408/57 |
| 8,066,457 B2 * | 11/2011 | Buettiker et al. | .............. | 409/234 |
| 8,079,784 B2 * | 12/2011 | Prichard et al. | .................. | 407/11 |
| 8,573,098 B2 * | 11/2013 | Hoffer et al. | ....................... | 82/50 |
| 2009/0226268 A1 * | 9/2009 | Pilkington | ..................... | 407/113 |
| 2009/0283975 A1 * | 11/2009 | Kretzschmann et al. | ........ | 279/76 |
| 2010/0254777 A1 * | 10/2010 | Sch fer | ............................. | 408/57 |
| 2011/0217131 A1 * | 9/2011 | Bonnarang et al. | ............. | 407/11 |
| 2012/0200050 A1 * | 8/2012 | Kretzschmann et al. | ........ | 279/76 |
| 2012/0275876 A1 * | 11/2012 | Lehto et al. | .................... | 409/137 |
| 2013/0071196 A1 * | 3/2013 | Oettle | ............................... | 408/56 |

FOREIGN PATENT DOCUMENTS

| | | |
|---|---|---|
| DE | 197 25 100 A1 | 12/1998 |
| DE | 10227687 A1 * | 1/2004 |
| DE | 603 06 927 T2 | 11/2006 |
| JP | 2006218549 A * | 8/2006 |
| WO | WO 9206817 A2 * | 4/1992 |
| WO | 2005/044498 A1 | 5/2005 |

* cited by examiner

*Primary Examiner* — Eric A Gates
*Assistant Examiner* — Paul M Janeski
(74) *Attorney, Agent, or Firm* — Larry R. Meenan, Esq.

(57) ABSTRACT

A coolant distributor for use with a cutting head of a machine tool that is adapted to be rotated about a rotational axis. The coolant distributor comprises a generally cylindrical body adapted to be coupled to the cutting head about the rotational axis, the generally cylindrical body having a first end and an opposite second end, the first end being disposed adjacent the cutting head when the generally cylindrical body is coupled to the cutting head. At least one feed passage is formed in the generally cylindrical body, the feed passage having a first end disposed proximate the first end of the generally cylindrical body and a second end disposed proximate the second end of the generally cylindrical body. A deflecting element is disposed in the feed passage proximate the second end of the feed passage. An outflow passage is connected to the feed passage and disposed obliquely to the rotational axis.

17 Claims, 3 Drawing Sheets

COOLANT DISTRIBUTOR

BACKGROUND

1. Field of the Invention

The invention relates to a coolant distributor for a rotating cutting head of a machine tool.

2. Background Information

Cutting heads are subjected to high thermal loads during the machining operation and therefore a combined coolant and lubricant, for example a cooling lubricant, is provided to said cutting heads. The cooling lubricant acts to absorb thermal energy in the form of heat as well as reduces the heat caused by friction by forming a lubricating film.

Uniform distribution of the coolant and lubricant both to the cutting edges of the cutting head and to the bore wall and uniform and continuous re-wetting are essential for effective cooling, lubrication, and chip disposal, but are not sufficiently ensured by known solutions.

SUMMARY OF THE INVENTION

The present invention technically configures the feeding of the cooling lubricant in such a way that the cooling and lubricating effect of the cooling lubricant is better utilized. This is achieved in an inventive manner as a result of the combination of features in the independent claims. The claims that refer back contain partly advantageous developments of this invention and partly developments of this invention that are inventive on their own.

The invention is based on the idea that, during the finishing of a blind bore, for example using a reamer, the cooling lubricant jet striking the bottom of the bore is reflected in the direction of the cutting head. In this way, the cutting head is uniformly wetted with the cooling lubricant. In contrast to the cooling lubricant flow during the finishing of a through-bore, in which the cooling lubricant flows past the cutting head as it were, a comparatively larger cooling lubricant quantity passes into the region of the cutting edges during the reflection of the cooling lubricant flow during the finishing of a blind bore and thus promotes the cooling and lubricating properties on the one hand and the chip transport on the other hand. It is possible with the invention to apply, as it were, this reflection of the cooling lubricant flow during the finishing of a blind bore to the process for finishing a through-bore. A coolant distributor according to the invention simulates, as it were, the reflection effect of the bottom of the bore in the case of a blind bore. In addition, with the invention, the same cutting head can be used for the finishing of through-bores and blind bores.

A coolant distributor according to the invention is a device for distributing a coolant and/or lubricant, consisting of at least one feed passage facing the cutting head in the final assembly state, at least one deflecting element on that end of the feed passage which is remote from the cutting head, and at least one outflow passage which runs obliquely in the direction of the cutting head and is connected to the feed passage. In this case, each feed passage directs the cooling lubricant into the coolant distributor, which cooling lubricant flows in, for example via feed lines, in a cutting head. By means of the respective deflecting element, the cooling lubricant passes into the respective outflow passage and is directed from there onto the cutting edges of the cutting head by means of the cooling lubricant pressure, which acts during the operating state, and by means of the centrifugal force. The cooling lubricant thus reaches the contact surface between cutting head and bore wall. In principle, one outflow passage together with the rotary movement of the coolant distributor already wets the cutting head and the bore wall. However, an embodiment of the coolant distributor having a plurality of outflow passages arranged in particular in an equispaced manner is preferred, since the wetting is more uniform here.

In a preferred embodiment, an encircling annular collecting groove is located on that end face of the coolant distributor which faces the cutting head, and the feed passages open into said collecting groove with their inlet openings, which are remote from the deflecting elements. The collecting groove therefore connects all the feed passages to one another and provides for a uniform distribution of the cooling lubricant to the feed passages. At the same time, this collecting groove serves as a reservoir in which the cooling lubricant used collects until it is then directed under pressure into the feed passage.

If the coolant distributor is produced as a component of a multi-piece cutting head, an embodiment of the coolant distributor component with a clamping bolt projecting in the direction of the main head carrying the cutting body is considered to be especially advantageous. This clamping bolt can have, for example, a thread on the end facing the main spindle of the machine tool and can thus simplify the mounting of the cutting head.

In a further preferred embodiment, the feed passages are designed as through-bores and are closed at the end by spherical deflecting elements. In this way, the production is technically especially simple. However, bending feed passages or feed passages provided with turns and differently shaped deflecting elements are also conceivable.

It is considered to be especially advantageous if the respective outflow passages each meet the respective feed passages at an angle of less than 90°, preferably at an angle of between 30° and 60°. As a result, the spray cones of the cooling lubricant which form at the outflow passage openings are optimally oriented.

In a further especially advantageous embodiment, an encircling distributor groove connects the openings of the outflow passages, the openings opening into the bore space in the direction of the cutting edges. In this way, the distribution of the coolant and lubricant in the bore space is additionally improved.

In a special embodiment, provision is made for the coolant distributor to be fastened to a cutting head like an attachment in such a way as to be in advance thereof in the feed direction, for example by means of a clamping bolt. The coolant distributor can therefore be combined with various cutting heads in a modular manner according to the modular construction principle. At this point, reference is expressly made to the fact that, irrespective of whether the coolant distributor is present as an attachment, as a component of a multi-piece cutting head, or as a version completely integrated into a one-piece cutting head, preferably at least one outflow passage opening is provided in advance of the cutting elements of the cutting head in the feed direction. The bore wall is thus covered with a cooling lubricant film immediately before contact with the main cutting edge.

Depending on whether a through-bore or a blind bore is to be machined with a set consisting of a mountable coolant distributor and a modular cutting head, the cutting head is either straight-fluted or obliquely fluted.

BRIEF DESCRIPTION OF THE DRAWINGS

The invention is described in more detail with reference to the exemplary embodiment. In the drawings.

DESCRIPTION OF THE PREFERRED EMBODIMENTS

Figure 1:
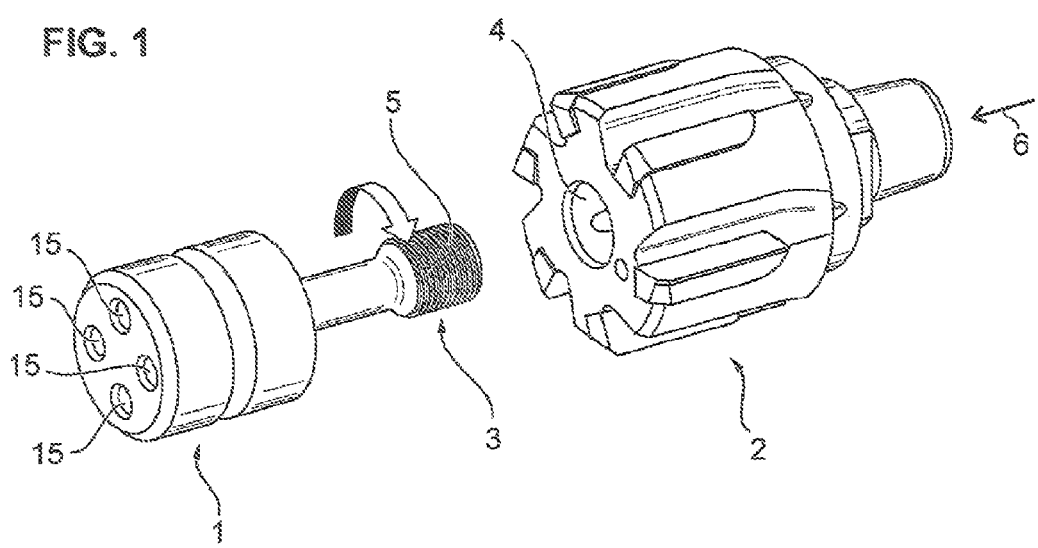
FIG. 1 shows a coolant distributor according to the invention in an embodiment as an attachment, together with a modular cutting head, before assembly.
Figure 2:
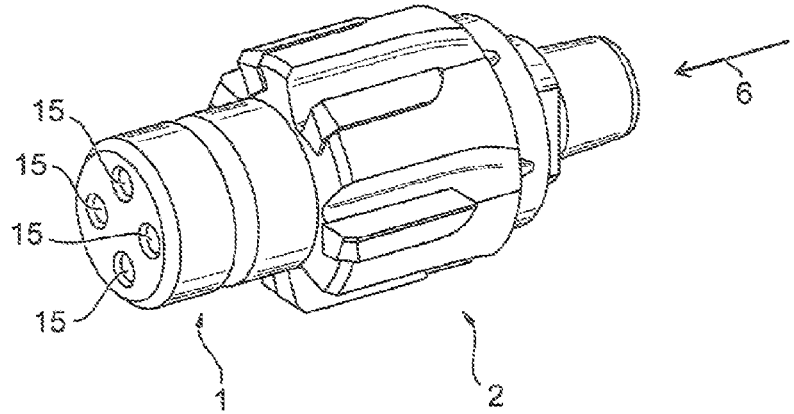
FIG. 2 shows a coolant distributor according to the invention in an embodiment as an attachment, together with a modular cutting head, after assembly.

An attachment-like cylindrical version of a coolant distributor 1 according to the invention is shown in FIG. 1 together with a modular cutting head 2. Fastened to the coolant distributor 1 is a clamping bolt 3 which, to connect the coolant distributor 1 to the cutting head 2, is inserted into an assembly opening 4 and then screwed to the cutting head 2 by means of an assembly thread 5. The corresponding final assembly state of cutting head 2 and coolant distributor 1, and thus the positioning of the coolant distributor 1 in advance of the cutting head 2 in feed direction 6, can be seen in FIG. 2.

Figure 3:
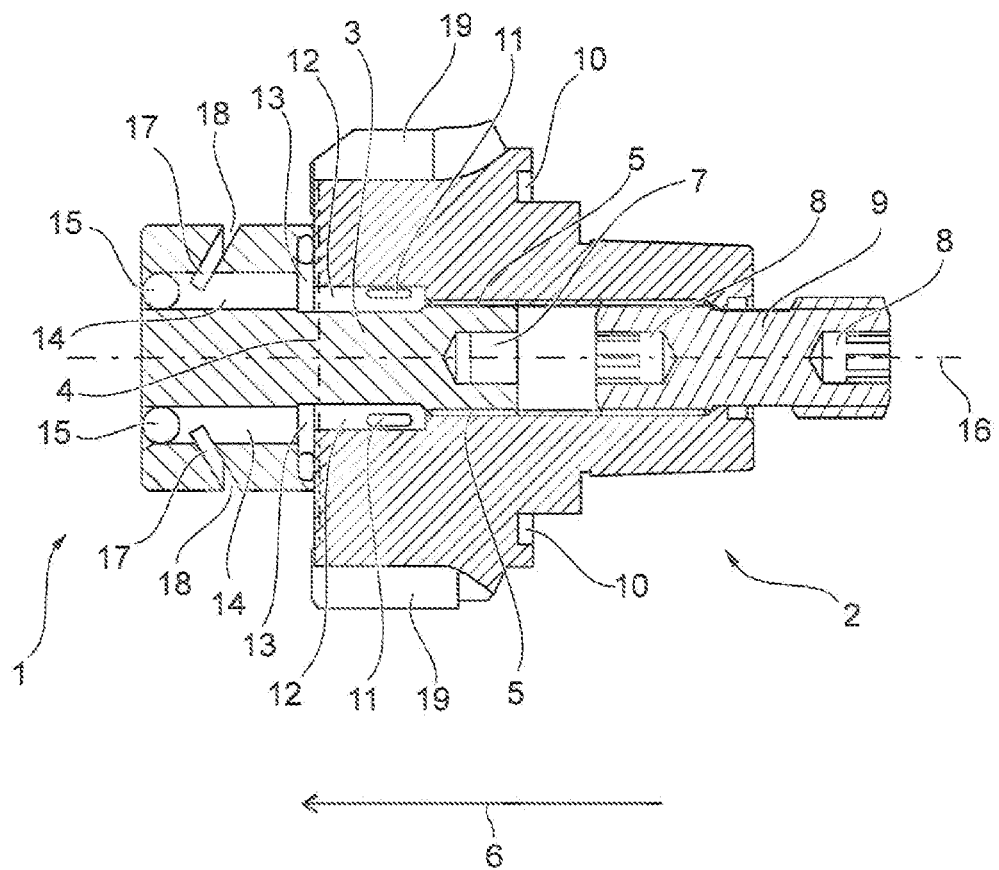
FIG. 3 shows the cross section of a coolant distributor according to the invention in an embodiment as an attachment mounted on a modular cutting head.
Figure 4:
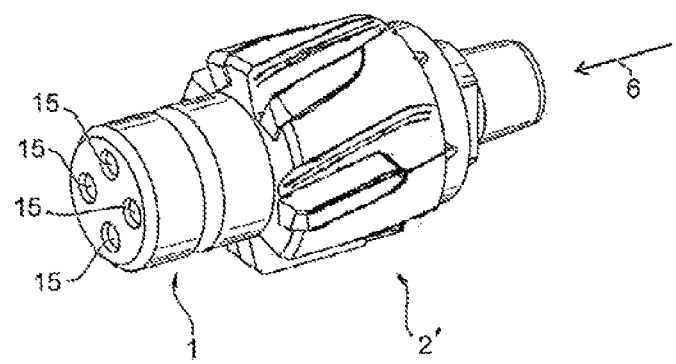
FIG. 4 shows a coolant distributor according to the invention in an embodiment as an attachment, together with a modular cutting head having oblique flutes, after assembly.

FIG. 3 shows a cross sectional view of the coolant distributor 1 mounted on the cutting head 2. It can be seen here that the clamping bolt 3 has a tool application portion 7 on the side facing away from the coolant distributor 1. Similar recesses 8 for the application of a tool are also located on a connecting screw 9 which connects the cutting head 2 to a tool shank (not depicted). The tool application portion 7 and the recesses 8 serve for the application of a dismantling tool, for example a wrench. The tool application portion 7 and the recesses 8 can be designed, for example, as a hexagon socket in which a corresponding hexagon socket wrench engages. Provision is made, during the dismantling, for first of all the cutting head 2 together with coolant distributor 1 to be released from the tool shank; for the connecting screw 9 to then be removed; and finally for the coolant distributor 1 to be unscrewed from the cutting head 2. The tool is assembled in the reverse order.

Filling openings 10, which receive the cooling lubricant, are located on the cutting head 2. The cooling lubricant received by the filling openings 10 is directed through the cutting head body and pours through a plurality of feed openings 11 into an encircling hollow-cylindrical collecting groove pre-chamber 12. An annular collecting groove 13 belonging to the coolant distributor 1 adjoins the collecting groove pre-chamber 12 in feed direction 6 in a liquid-tight manner.

The cooling lubricant collects in the collecting groove 13 until it finally flows under pressure into a plurality of feed passages 14 arranged in an equispaced manner. In the exemplary embodiment, the feed passages 14 are designed as through-bores which are each closed by a spherical deflecting element 15 at their ends remote from the cutting head in feed direction 6.

During the machining of the bore, the cutting head 2 rotates together with the coolant distributor 1 about its rotation axis 16, as a result of which the cooling lubricant is forced into the outflow passages 17. In this case, one outflow passage 17 each is connected to precisely one feed passage 14 in such a way that the course thereof forms a respective angle of about 60°. The outer openings of the outflow passages 17 with respect to the cylindrical coolant distributor 1 open into an encircling annular distributor groove 18. The cooling lubricant is directed from the distributor groove 18 onto the cutting elements 19 of the cutting head 2 by the centrifugal force.

The invention claimed is:

1. A coolant distributor for use with a cutting head of a machine tool that is adapted to be rotated about a rotational axis, the coolant distributor comprising:

a generally cylindrical body adapted to be coupled to the cutting head about the rotational axis, the generally cylindrical body having a first end and an opposite second end, the first end being disposed adjacent the cutting head when the generally cylindrical body is coupled to the cutting head;

at least one feed passage formed in the generally cylindrical body, the feed passage having a first end disposed proximate the first end of the generally cylindrical body and a second end disposed proximate the second end of the generally cylindrical body;

a spherical deflecting element disposed in, and closing the feed passage proximate the second end of the feed passage; and an outflow passage connected to the feed passage and disposed obliquely to the rotational axis.

2. The coolant distributor of claim 1 wherein the generally cylindrical body comprises an encircling annular collecting groove disposed at the first end of the generally cylindrical body; and wherein the at least one feed passage comprises a plurality of feed passages, each feed passage of the plurality of feed passages having a first end opening into the collecting groove.

3. The coolant distributor of claim 2 wherein the generally cylindrical body comprises a clamping bolt which projects from the first end, the clamping bolt having an assembly thread disposed thereon.

4. The coolant distributor of claim 1 wherein the generally cylindrical body comprises a clamping bolt which projects from the first end, the clamping bolt having an assembly thread disposed thereon.

5. The coolant distributor of claim 1 wherein each feed passage is formed as a through-bore in the generally cylindrical body.

6. The coolant distributor of claim 1 wherein the outflow passage is disposed at an angle between 30° and 60° with respect to the rotational axis.

7. The coolant distributor of claim 1 wherein the generally cylindrical body comprises an encircling distributor groove formed in an outer lateral surface of the generally cylindrical body; and wherein the outflow passage opens into the distributor groove.

8. The coolant distributor of claim 1 wherein the cutting head has a feed direction and wherein the generally cylindrical body is adapted to be mounted on the cutting head in such a way as to be in advance of the cutting head in the feed direction.

9. The coolant distributor of claim 8 wherein the cutting head comprises a straight-fluted reamer head.

10. The coolant distributor of claim 8 wherein the cutting head comprises an obliquely fluted reamer.

11. A coolant distributor for use with a cutting head of a machine tool that is adapted to be rotated about a rotational axis, the coolant distributor comprising:

a generally cylindrical body adapted to be coupled to the cutting head about the rotational axis, the generally cylindrical body having a first end and an opposite second end, the first end being disposed adjacent the cutting head when the generally cylindrical body is coupled to the cutting head;

an encircling annular collecting groove formed in the first end of the generally cylindrical body;

a plurality of feed passages, each formed as a through bore in the generally cylindrical body, each feed passage having a first end opening into the collecting groove and a second end disposed proximate the second end of the generally cylindrical body;

a plurality of deflecting elements, each element being disposed in a respective feed passage proximate the second end of the respective feed passage; and a plurality of outflow passages, each outflow passage connected to a respective feed passage and disposed obliquely to the rotational axis, wherein each feed passage is closed proximate the second end by a spherical deflecting element.

12. The coolant distributor of claim 11 wherein the generally cylindrical body comprises a clamping bolt which projects from the first end, the clamping bolt having an assembly thread disposed thereon.

13. The coolant distributor of claim 11 wherein each outflow passage is disposed at an angle between 30° and 60° with respect to the rotational axis.

14. The coolant distributor of claim 11 wherein the generally cylindrical body comprises an encircling distributor groove formed in an outer lateral surface of the generally cylindrical body and wherein each outflow passage opens into the distributor groove.

15. The coolant distributor of claim 11 wherein the cutting head has a feed direction and wherein the generally cylindrical body is adapted to be mounted on the cutting head in such a way as to be in advance of the cutting head in the feed direction.

16. The coolant distributor of claim 15 wherein the cutting head comprises a straight-fluted reamer head.

17. The coolant distributor of claim 15 wherein the cutting head comprises an obliquely fluted reamer.

* * * * *